(No Model.) 3 Sheets—Sheet 1.

J. E. M. BECKER.
VEHICLE WHEEL.

No. 605,070. Patented June 7, 1898.

Witnesses:
F. W. Dunton
William Schulz

Inventor:
John E. M. Becker
per Roeder & Briese attorneys

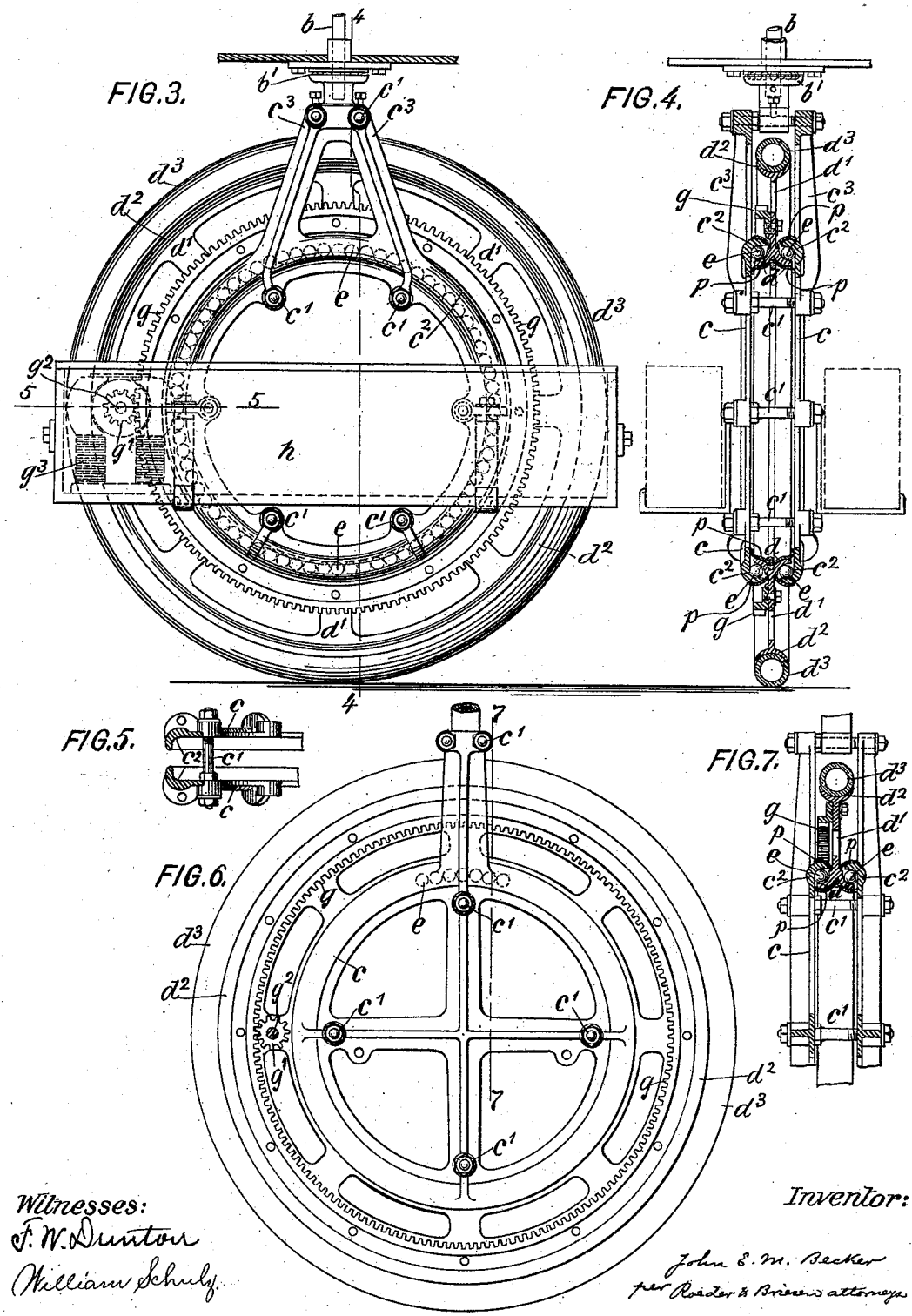

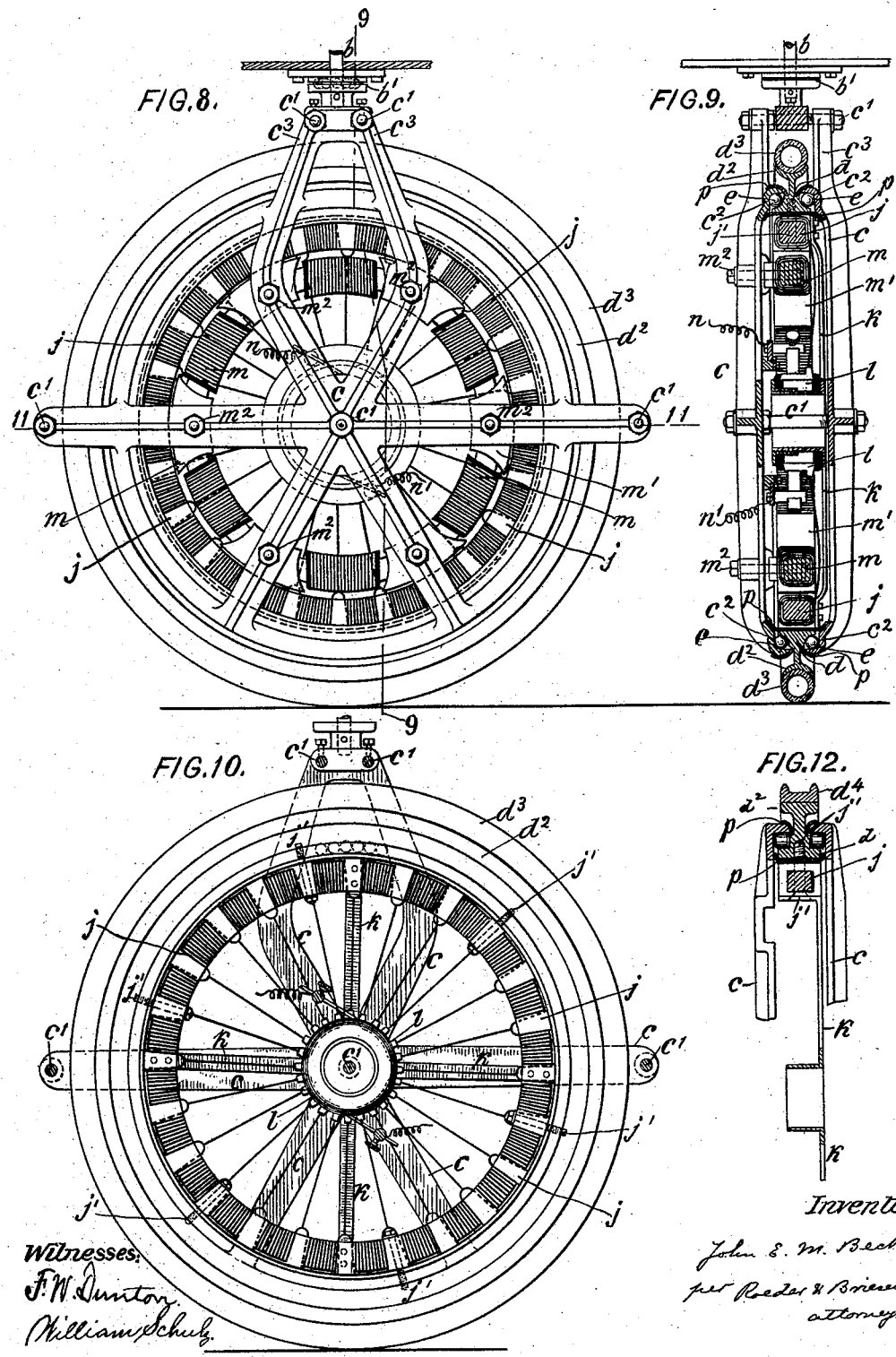

UNITED STATES PATENT OFFICE.

JOHN E. M. BECKER, OF NEW YORK, N. Y., ASSIGNOR TO EMILY M. DUNTON, OF HOLLIS, NEW YORK.

VEHICLE-WHEEL.

SPECIFICATION forming part of Letters Patent No. 605,070, dated June 7, 1898.

Application filed September 1, 1897. Serial No. 650,223. (No model.)

*To all whom it may concern:*

Be it known that I, JOHN E. M. BECKER, of New York city, county and State of New York, have invented an Improved Vehicle-Wheel, of which the following is a specification.

This invention relates to a wheel for motor and other vehicles and railway-cars which is so constructed that it runs very lightly and that an axle is entirely dispensed with.

The wheel is provided with a laterally-projecting flange which is surrounded by a correspondingly-projecting flange of a frame and with antifriction balls interposed between the flanges of the wheel and frame. Thus light running is insured, and as the axle, axle-bearing, and spokes are dispensed with the construction of the wheel is greatly simplified.

Figure 11:
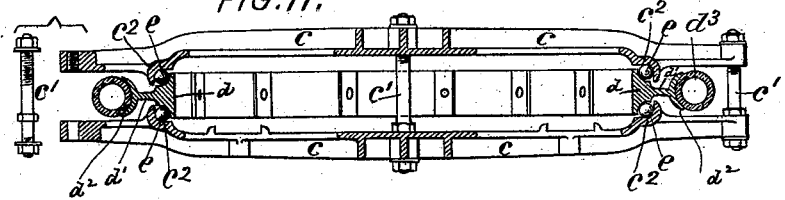
Figure 1:
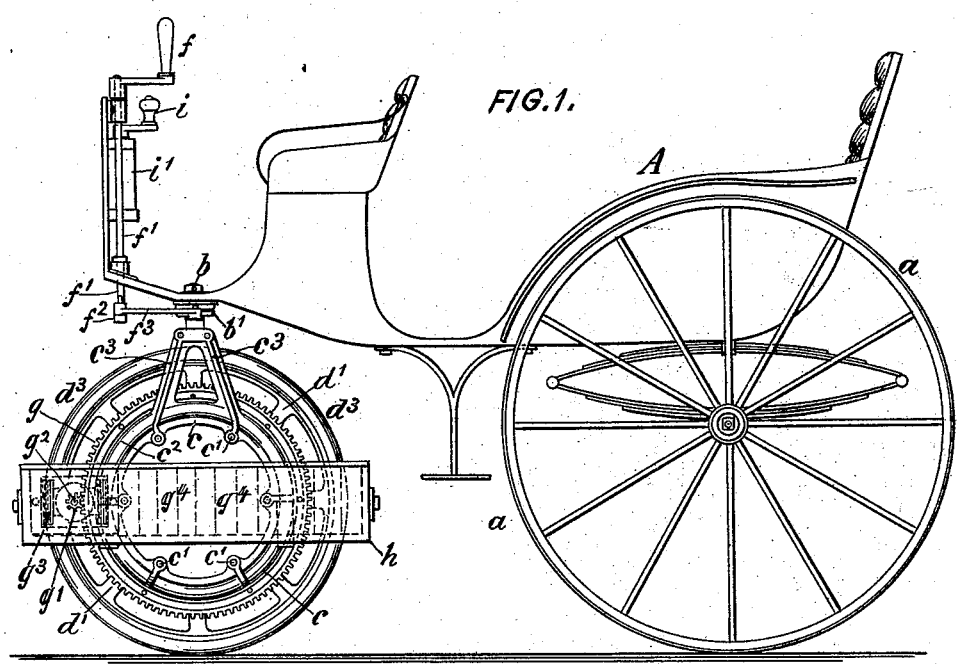
Figure 2:
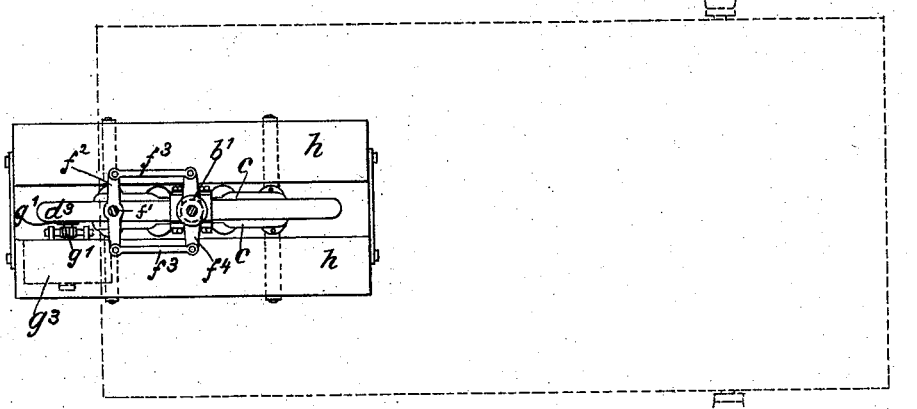

In the accompanying drawings, Figure 1 is a side elevation of a motor-vehicle provided with my improved wheel. Fig. 2 is a sectional plan of the wheel and steering apparatus; Fig. 3, a side elevation of the wheel; Fig. 4, a longitudinal section on line 4 4, Fig. 3; Fig. 5, a detail horizontal section of the wheel-frame on line 5 5, Fig. 3; Fig. 6, a side elevation of a modification of the wheel; Fig. 7, a section on line 7 7, Fig. 6; Fig. 8, a side elevation of a further modification of the wheel; Fig. 9, a vertical section on line 9 9, Fig. 8; Fig. 10, a side elevation similar to Fig. 8, but having that part of the frame which carries the field-magnets removed; Fig. 11, a horizontal section on line 11 11, Fig. 8, with the field-magnets and armature omitted; and Fig. 12, a section through part of the wheel, showing a modification of the tire.

The letter A represents the body of a suitable vehicle—such as a carriage, tricycle, delivery-wagon, &c.—supported at its rear axle by a pair of running-wheels $a$ and at its front by a combined steering and motor wheel, the construction of which forms the subject of this invention. The king-bolt $b$, carrying the usual fifth-wheel $b'$, is connected at its lower end to the upper part of a duplex frame $c\ c$, Fig. 4. The two halves of this frame are placed side by side at a short distance apart and are connected to one another by adjusting stay-bolts $c'$, that may be drawn up from time to time to compensate for wear. Each frame-section $c$ is made with an annular inwardly-turned flange $c^2$, that constitutes a ball-race and is provided with an upwardly-extending bracket $c^3$, to which the king-bolt $b$ is rigidly connected so that the wheel may be steered.

Between the grooved flanges $c^2$ of the frame-section $c\ c$ there is confined a doubly-grooved circular flange or ring $d$, which is made of smaller diameter than the flanges $c^2$ and is surrounded thereby. The flange $d$ is formed on the inner edge of an annular web $d'$, that projects radially beyond the frame-flanges $c^2$ and terminates in a rim $d^2$, upon which the usual rubber tire $d^3$ is seated.

The parts $d\ d'\ d^2$ collectively constitute the body of an annular wheel which is at its center revolubly held to the frame $c$, while its outer end projects beyond such frame to contact with the ground. Between the grooved flanges $c^2$ and the doubly-grooved flange $d$ are interposed a number of antifriction balls or rollers $e$, that insure a light running of the wheel within its support and which are protected by a dust-guard $p$.

In order to steer the wheel, I employ a hand-crank $f$, the shaft $f'$ of which connects by cross-piece $f^2$, Fig. 2, and links $f^3$ with a cross-piece $f^4$, secured to the fifth-wheel $b'$. Thus by manipulating the crank-handle $f$ the wheel may be turned in either direction, as will be readily understood.

Power is applied to the wheel in motor-vehicles, preferably from a source of electric energy, either by a gear connection or in a gearless manner.

In Figs. 1 to 5 I have shown a ring $g$, having an external gear and affixed to the web $d'$ of the wheel. This ring is engaged by a pinion $g'$, which receives its motion from the armature-shaft $g^2$ of an electric motor $g^3$. The motor $g^3$ is placed within one of a pair of boxes $h$, which contain the cells $g^4$ of an electric storage battery and are secured to the outer sides of the frame $c$. Motion is controlled by a hand-crank $i$ of a current-regulator $i'$ to send a current of suitable intensity from the battery into the motor in the usual manner.

In Figs. 6 and 7 the construction is the same as above described, excepting that the ring $g$ is provided with an internal gear, into which the pinion $g'$ meshes.

In Figs. 8 to 11 the gear connection is entirely dispensed with, a gearless arrangement for driving the wheel being substituted. In these figures I fasten to the ring $d$ by screws $j'$ the annular concentric armature $j$, which is embraced by the ring. To the armature there is attached by spider $k$ the concentric commutator $l$, which is thus revoluble, together with the armature and wheel.

The fixed field-magnets $m$ and pole-pieces $m'$ of the motor are arranged within the armature and concentric thereto. Bolts $m^2$ rigidly connect the field-magnets to that one of the frame-section $c$ which is on the side opposite from the spider $k$. The current entering at $n$ and passing out at $n'$ will in this way revolve the armature around the field-magnets, so as to impart direct motion to the motor-wheel without the use of any gearing.

In Fig. 12 the rubber tire $d^3$ is shown to be replaced by a flanged metal tire $d^4$, shrunk upon rim $d^2$, such construction being more particularly designed for heavy vehicles.

What I claim is—

1. A vehicle-wheel having a laterally-projecting flange combined with a frame having a correspondingly-projecting flange that surrounds the wheel-flange, and antifriction-balls interposed between the flanges, substantially as specified.

2. A vehicle-wheel having a laterally-projecting flange combined with a duplex frame having a pair of inwardly-projecting flanges that surround the wheel-flange, and antifriction-balls interposed between the wheel-flange and the frame-flanges, substantially as specified.

3. A vehicle-wheel having a laterally-projecting doubly-grooved flange combined with a duplex frame having a pair of inwardly-projecting flanges that surround the wheel-flange, and antifriction-balls interposed between the wheel-flange and the frame-flanges, substantially as specified.

4. In a vehicle, the combination of a wheel having a laterally-projecting flange, with a pivoted frame having a correspondingly-projecting flange that surrounds the wheel-flange, antifriction-balls interposed between the flanges, means for imparting rotary motion to the wheel, and means for turning the frame on its pivot, substantially as specified.

JOHN E. M. BECKER.

Witnesses:
F. V. BRIESEN,
WILLIAM SCHULZ.